United States Patent [19]

Papizan

[11] Patent Number: 4,500,059
[45] Date of Patent: Feb. 19, 1985

[54] FISHING SEAT TRAY

[76] Inventor: John L. Papizan, 3753 Aletha Dr., Baton Rouge, La. 70814

[21] Appl. No.: 409,118

[22] Filed: Aug. 18, 1982

[51] Int. Cl.³ ................................................. A47C 7/62
[52] U.S. Cl. .............................. 248/205.1; 248/220.2; 248/250; 248/309.1; 211/88; 297/192
[58] Field of Search ................. 248/250, 205.1, 222.2, 248/220.2, 235, 247, 200, 300, 48.1, 48.2, 223.4, 224.1, 224.2, 309 R; 108/45, 49, 97; 211/86, 88, 71; 297/188, 192; 5/503; D6/199

[56] References Cited

U.S. PATENT DOCUMENTS

| | | | |
|---|---|---|---|
| 178,534 | 6/1876 | Latham | 248/224.2 |
| 581,681 | 4/1897 | Shauer . | |
| 821,498 | 5/1906 | Jackson | 248/222.2 |
| 1,056,911 | 3/1913 | Kinzey | 248/222.2 |
| 1,073,483 | 9/1913 | Frost . | |
| 1,082,443 | 12/1913 | Possons | 248/222.2 |
| 1,822,638 | 9/1931 | Aiello . | |
| 2,185,907 | 1/1940 | Alexander . | |
| 3,233,940 | 2/1966 | Tooley . | |
| 3,259,082 | 7/1966 | Williams | 108/152 |
| 3,338,628 | 8/1967 | Evans . | |
| 3,690,724 | 9/1972 | Douglas . | |

Primary Examiner—William H. Schultz
Assistant Examiner—Robert A. Olson
Attorney, Agent, or Firm—David L. Ray

[57] ABSTRACT

A fishing seat tray assembly which is easily attachable to the common pedestal seat utilized by modern sport fishermen. The tray assembly of the invention includes, in combination therewith, a novel attachment means. The attachment means includes at least two plates which have at least one ridge thereon which cooperates with and is received in a slot contained in the tray. The plates are connected to the bottom side of the seat by screws, bolts or any conventional fastener means.

1 Claim, 5 Drawing Figures

FISHING SEAT TRAY

BACKGROUND OF THE INVENTION

The present invention is related to trays for holding fishing equipment, and in particular, to a tray attachable to boat seats for holding fishing equipment.

Keeping fishing equipment neatly arranged and readily accessable has long been a problem for fishermen. On commercial vessels it is absolutely essential that all fishing equipment, lines and the like be neatly positioned and easily accessable if the commercial fishing vessel is going to compete successfully with other vessels. Furthermore, it is necessary that fishing equipment and gear be stored in such a manner that it will not endanger the fishermen by exposing the fisherman to hooks or other items which can cause injury.

In recent times sport fishermen have begun to widely use, especially in the United States, a type of sport fishing boat which is commonly referred to as a "Bass Boat". Such vessels may be made of fiber glass or aluminum and commonly have seats which are mounted on vertical predestals attached to the deck of the boat. The seats allow the fisherman to sit comfortably in a normal position in the boat much as he would in a common household or a dining room chair, and also swivel around in a circle.

While such seats are very comfortable and allow the fisherman to swivel the seat from one position to the other, a common problem faced by such fishermen is access to fishing gear such as fishing lures, pliers, knives, and the like which are commonly placed on the bottom of the boat, usually in a box referred to as a "tackle box".

Thus, for a fisherman to reach his tackle box, he must either get out of the predestal chair or bend down from the chair to the floor of the boat in an attempt to reach the box. Such a bending motion, or actually the getting out of the pedestal chair, is inconvenient for the fisherman and is time consuming.

It is quite common for the fresh water fisherman to change baits many times in the course of a fishing trip. During such bait changes it is frequently necessary that the fisherman have access to pliers and fishing baits contained in the tackle box.

In fishing tournaments where the fisherman is given a fixed period of time to catch the largest number of fish in order to win valuable prizes, it is essential that the fisherman has immediate access to his fishing lures and other equipment. Some fishermen, who are in a hurry due to the pressure of the tournment or the excitement of a large school of fish, will drop lures with hooks therein on the floor of the boat along with other fishing gear. Such baits and gear can cause injury to the fisherman if he forgets and steps on the gear while reaching for other equipment after leaving his seat. A fisherman may slip on such fishing gear on the floor and fall overboard or he may cut his foot on knives or stick hooks into his feet.

Thus there is need for an apparatus which will place the fisherman's essential gear in a position so that he does not have to bend over or get out of his fishing seat in order to utilize such equipment.

SUMMARY OF THE INVENTION

In accordance with the present invention there is provided a fishing seat tray assembly which is easily attachable to the common pedestal seat utilized by modern sport fishermen. The tray assembly of the invention includes, in combination therewith, a novel attachment means. The attachment means includes at least two plates which have at least one ridge thereon which cooperates with and is received in a slot contained in the tray. The plates are connected to the bottom side of the seat by screws, bolts or any conventional fastener means.

The novel fishing seat tray of the invention permits the fisherman to carry a large amount of his gear on the side of the seat from which he is fishing immediately adjacent to the leg of the fishermen. Thus, the fisherman can change baits, utilize knives, pliers and the like without the necessity of getting out of his seat or bending or stooping over. The time necessary to change baits is greatly decreased and the pleasure and comfort of the fisherman is greatly enhanced by not having to continuously get out of his seat or bend over to grasp necessary fishing equipment.

DESCRIPTION OF THE PREFERRED EMBODIMENT

Figure 1:
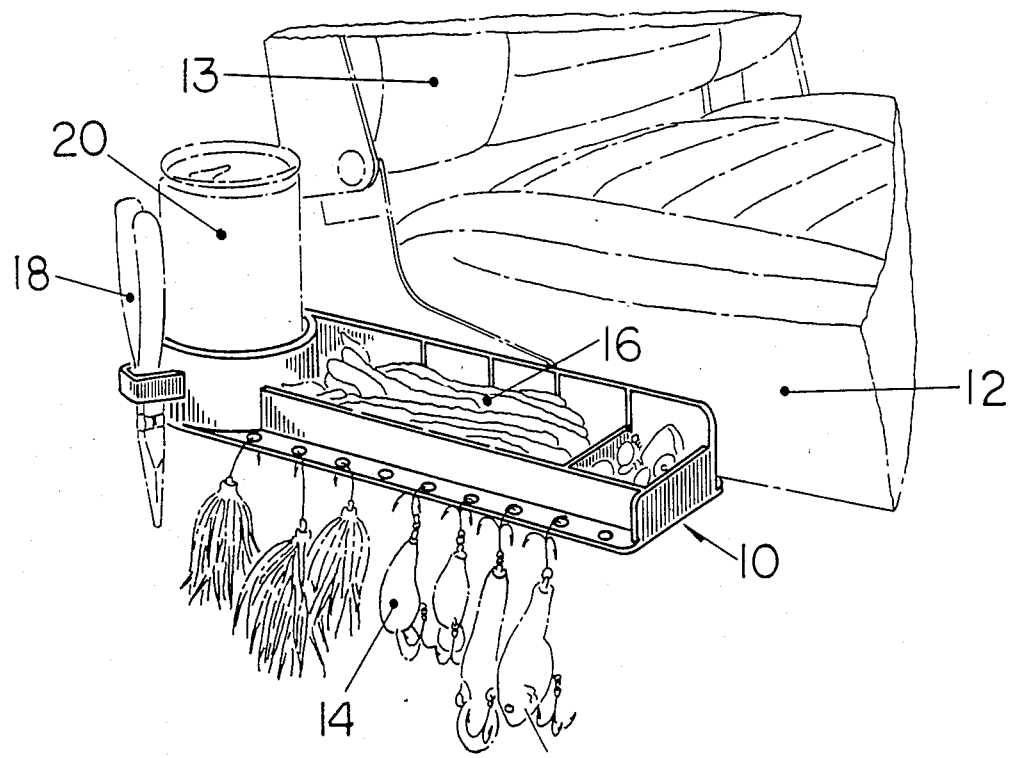
FIG. 1 is a partially cut-away perspective view of the fishing seat tray of the invention connected to a fishing seat.

Referring now to FIG. 1, the fishing seat tray of the present invention is generally indicated by the numeral 10. The tray is shown attached to a chair or fishing seat 12 which is a conventional pedestal mounted seat which rotates 360 degrees on the pedestal. A series of fishing lures 14 and 16 are shown contained and hanging from the tray, in addition to a pair of pliers 18 and a beverage can 20.

As can be seen in FIG. 1, the tray of the present invention is adjacent to seat 12 in close proximity to the portion of the seat upon which the legs of the fisherman rests. Thus, the tray assembly of the invention allows the fisherman to easily reach into the tray without having to bend over, stoop down, or get out of the fishing chair 12.

Figure 2:
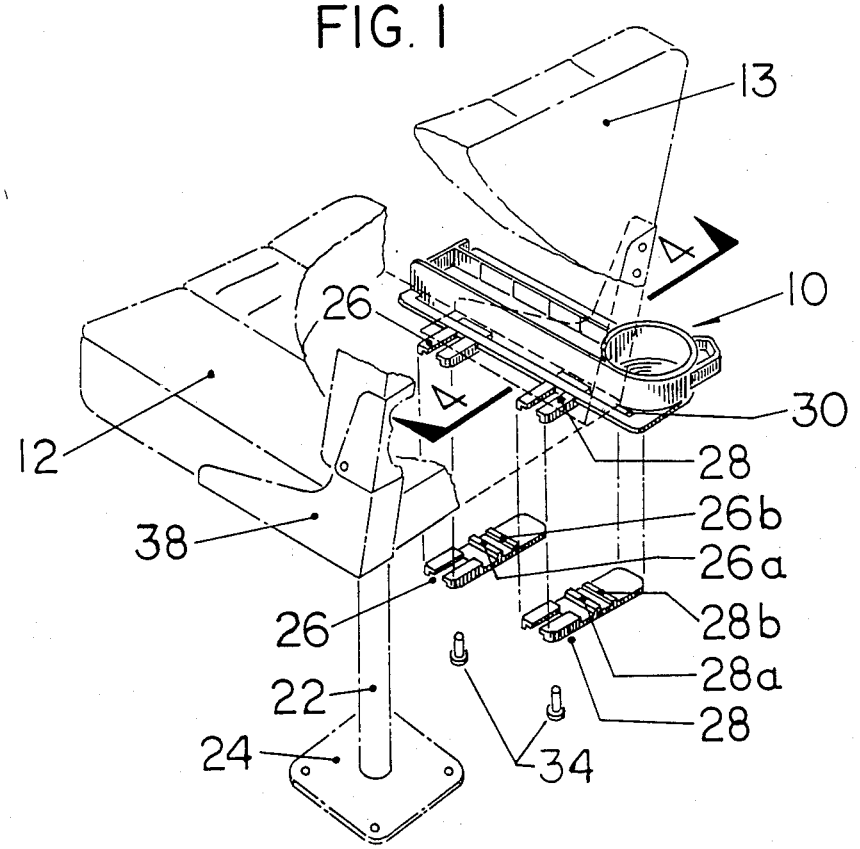
FIG. 2 is a perspective exploded view of the tray of the invention shown attached to a fishing seat on a pedestal.
Figure 3:
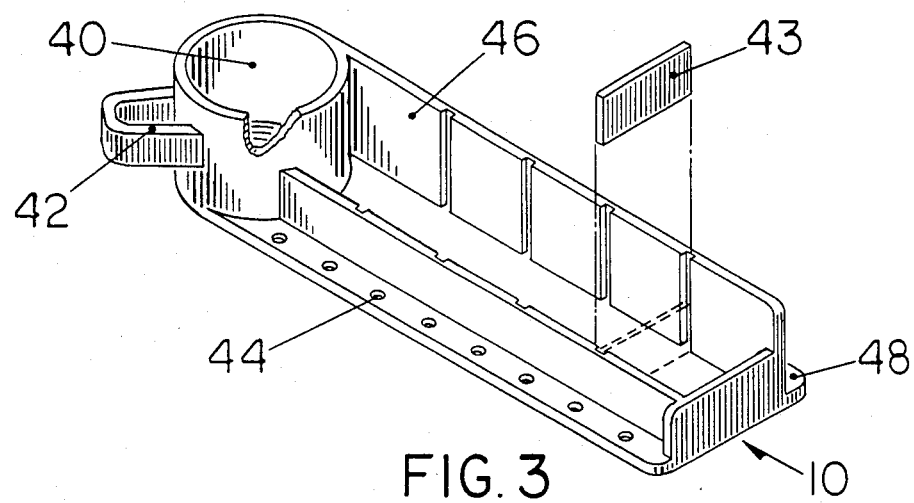
FIG. 3 is a perspective partially cut-away view of a preferred embodiment of a fishing tray.

In FIG. 2, chair 12 is shown to be mounted on pedestal 22, and has back rest 13. Pedestal 22 has a plate 24 at the bottom thereof which fits onto the deck of a conventional sport fishing vessel.

Figure 4:
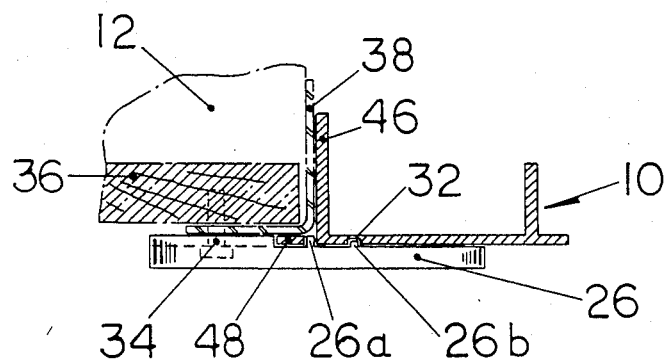
FIG. 4 is a cross-sectional view taken along lines 4—4 of FIG. 2.
Figure 5:
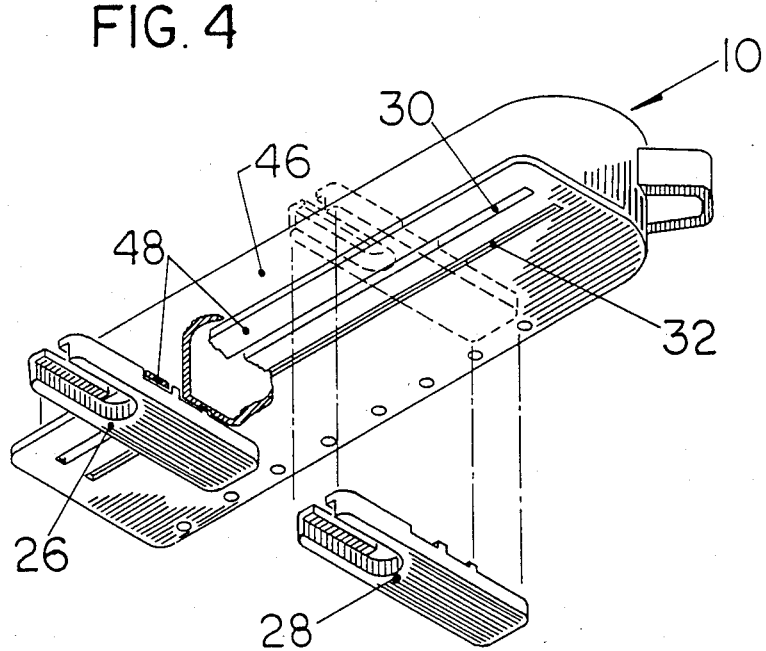
FIG. 5 is a bottom cut-away exploded perspective view of the fishing tray of the invention.

As can be seen in FIGS. 2 and 4, the fishing seat tray 10 of the invention is attached to the bottom 36 of seat 12 by plates 26 and 28, which are identical. Plates 26 and 28 have two ridges therein, 26a and 26b and 28a and 28b, which are adaptable to be received in slots 30 and 32, as can be seen in FIGS. 2, 4 and 5 of the drawings. If desired, ridges 26b and 28b, and slot 32 could be eliminated, therefore, leaving only one slot and one ridge. However, in the preferred embodiment two slots 30 and 32 are preferably utilized for receiving two ridges.

As can be seen in FIG. 4, slot 32 does not extend all the way through tray 10. However, if desired, slot 32 could be extended all the way through tray 10.

Plates 26 and 28 are connected to seat 12 as shown in FIG. 4 by fasteners such as bolts or screws 34 which are shown in FIG. 4 to be screwed into a wood bottom 36 contained in the bottom of seat 12. However, the seat 12 could have a metal bottom or the like, with metal screws or bolts screwed therein.

In some common seats, a side brace 38 shown in FIGS. 2 and 4 is utilized on the seat. However, with braces 38 in place it is only necessary that a hole be drilled in the bottom thereof for bolt 34 to be extended therethrough.

The remaining components of the tray such as the beverage holder 40, plier holder 42, partitions 43 and holes 44 can be added to contain the various items in the tray. Many configurations of the tray may be utilized in accordance with the present invention. Wth the novel plates of the present invention cooperating with the slot or slots in the tray, the tray can be quickly and easily attached to a conventional boat seat while at the same time providing a rigid structure which can hold a large amount of equipment. Furthermore, various trays can be utilized as long as they contained the appropriate slots for meshing with plates 26 and 28.

As can be seen in FIG. 4 it is necessary that the plates 26 and 28 be positioned such that the side 46 adjacent to seat 12 fits snuggly against the seat or brace 38. Also, it is necessary that the outer lip 48 adjacent to slot 30 of tray 10 fits under the bottom of the seat to prevent the tray 10 from moving upwardly.

A further advantage of the plates of the present invention in attaching a tray to boat seats is that the plates can be positioned at various locations along the edge of the bottom of the seat to avoid any obstructions such as previously placed bolts, screws or the like. Furthermore, if the tray is desired to be repositioned after the plates are attached to the bolts, screws 34 holding the plates to the seat may be loosened and the tray moved forwardly or backwardly along the plates 26 and 28.

Although the preferred embodiments of the present invention have been disclosed and described in detail above, it should be understood that the invention is in no sense limited thereby, and its scope is to be determined by that of the following claims.

What is claimed is:

1. A tray assembly for connection to a fisherman's seat comprising, in combination:
   a. a tray for containing fishing lures, said tray having
      i. a top side,
      ii. a flat, planar bottom side,
      iii. a side wall extending vertically upwardly from said top side of said tray and horizontally along the length of the tray,
      iiii. a horizontal lip connected to said side wall adapted to be placed under the bottom of a fisherman's seat,
      iiiii. two parallel longitudinal slots located on said bottom side of said tray, said longitudinal slots being parallel to said side wall,
   b. a generally rectangular, elongated plate for attaching said tray to a seat, said plate having a bottom side and a top side, said plate having a first portion which is adapted to extend beneath the bottom of said seat and a second portion which extends beneath the bottom of said tray, said first portion having a hole therein in which is received a fastener to connect said plate to the bottom of said seat, said top side of said second portion of said plate having two parallel, longitudinal ridges thereon adapted for receipt in two longitudinal slots located on said bottom side of said tray, the surface of said second portion of the top side of said plate on each side and between said two ridges being a flat, generally rectangular plane adapted to contact and support said flat, planar bottom side of said tray, said bottom side of said plate being a flat, generally rectangular plane, the top side of said first portion of said plate being a flat, generally rectangular plane adapted to contact the flat bottom of said seat, said plate being adapted to connect to the bottom of a fisherman's seat to bias said horizontal lip against the bottom of said fisherman's seat and to bias said sidewall against a side of said fisherman's seat.

* * * * *